United States Patent

Horn et al.

[11] Patent Number: 5,953,049
[45] Date of Patent: Sep. 14, 1999

[54] ADAPTIVE AUDIO DELAY CONTROL FOR MULTIMEDIA CONFERENCING

[75] Inventors: David N. Horn, Summit; Amir M. Mane, Lincroft; Pierre David Wellner, Middletown, all of N.J.

[73] Assignee: Lucent Technologies Inc., Murray Hill, N.J.

[21] Appl. No.: 08/691,737

[22] Filed: Aug. 2, 1996

[51] Int. Cl.⁶ ............................................. H04N 7/14
[52] U.S. Cl. ........................... 348/15; 348/14; 379/93.21
[58] Field of Search ................................ 348/15, 16, 17; 379/202, 93.21; 370/260; 381/97

[56] References Cited

U.S. PATENT DOCUMENTS 4,937,856  6/1990  Natarajan .
5,113,431  5/1992  Horn .
5,231,492  7/1993  Dangi et al. .
5,371,534  12/1994  Dagdeviren et al. .
5,689,553  11/1997  Ahuja et al. ............................ 379/202
5,818,514  10/1998  Duttweiler ............................... 348/15

FOREIGN PATENT DOCUMENTS 407059030  3/1995  Japan .............................. H14N 5/60

Primary Examiner—Paul Loomis
Assistant Examiner—Melur Ramakrishnovl

[57] ABSTRACT

In an illustrative embodiment, an audio/video conferencing system comprises two or more audio/video terminals, in which the transmitted and/or received audio is automatically adjusted to provide synchronization between audio and video during periods of monologue (i.e., single talker active for significant duration). During interactive periods in which more than one talker is active, the audio delay is automatically adjusted to be less than the video delay, thus improving audio conference quality.

27 Claims, 6 Drawing Sheets

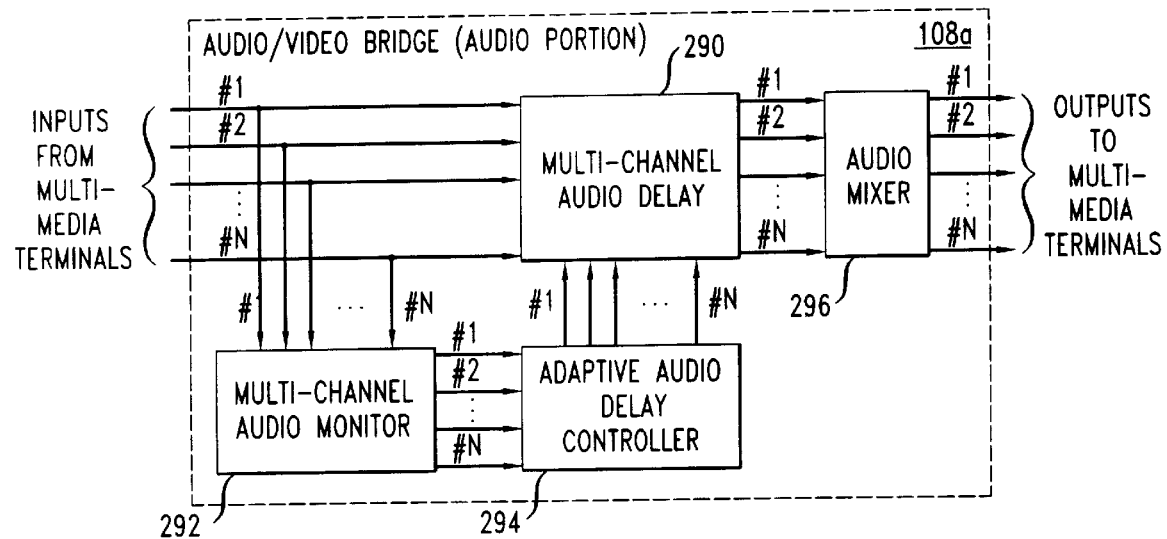
FIG. 2B
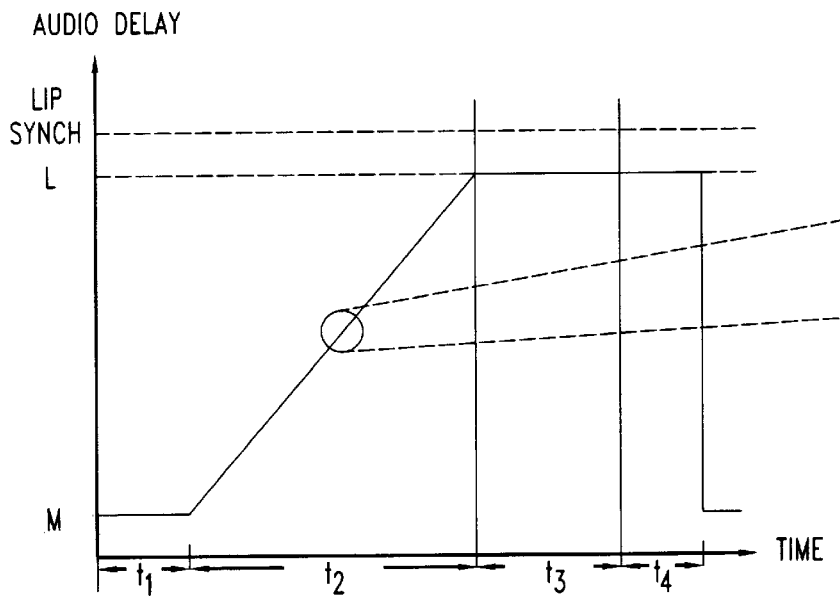
FIG. 3A
FIG. 3B

ADAPTIVE AUDIO DELAY CONTROL FOR MULTIMEDIA CONFERENCING

BACKGROUND OF THE INVENTION

1. Field of the Invention

The present invention relates to multimedia conferencing in general and, more particularly, to adaptive audio delay control for multimedia conferencing.

2. Description of the Related Art

Multimedia conferencing allows two or more participants remote from each other to engage in a conference call in which each of the parties participating in the multimedia conference transmits and receives audio and video data.

To transmit the necessary large amounts of video data over low bandwidth communication lines, video data compression and decompression is often employed. Typically, these compression functions are performed by a coder/decoder (CODEC), which delays the video image by several hundred milliseconds. In general, talking head videos are best understood when the audio and video signals are synchronized to provide actual lip sync or at least substantially synchronized to provide virtual lip sync. Accordingly, most audio/video systems typically insert a predetermined amount of audio signal delay in order to keep the audio signal synchronized with the video signal.

However, the insertion of audio signal delay can often be detrimental to the natural flow of the conversation and to the perceived audio conference quality, resulting in unnatural conference quality. For example, when a first speaker is carrying on a monologue, if a second speaker tries to interrupt at a particular point and the second speaker's audio is delayed, the second speaker will not interrupt the first speaker at the desired time. Such a situation tends to cause confusion, particularly if a plurality of speakers are actively participating in the conference. In addition, added audio signal delay tends to slow down conference dynamics, further resulting in unnatural conference quality.

Accordingly, there is a need to overcome the above-noted problems associated with the prior art.

SUMMARY OF THE INVENTION

Although audio signal delay can be detrimental to audio conference quality, there is a certain degree of user tolerance to slip between the timing of the output of the audio signal and the output of the video signal (i.e., audio/video sync slip). In addition, research shows that the audio channel is the primary channel during interactive conversations, and the video is of secondary importance. Keeping these factors in mind, the present invention seeks to optimize the multimedia conference experience by automatically managing audio signal delay according to conference dynamics.

Accordingly, in an illustrative embodiment of the invention, an audio/video conferencing system comprises two or more audio/video terminals in which the delay of the audio channel is automatically adjusted according to conference dynamics, in particular, according to the degree of interactivity. During extended periods of monologue (i.e., single talker active for significant duration), audio delay is adjusted to provide audio/video synchronization, i.e., lip sync. During interactive periods, i.e., frequent change of talker, audio delay is automatically adjusted to provide less audio delay than video delay, thus improving audio conference quality at the expense of a tolerable amount of audio/video sync slip.

Embodiments of the present invention can be implemented either on a bridge or on a multimedia terminal. Implementation on the bridge has the advantage that the system can take into account the activity of all participants in the conference in order to provide a more sophisticated control algorithm. In addition, the bridge can implement audio delay management for multimedia terminals not having delay management, although to do this, the multimedia terminals must have the ability to set their audio delay to zero or have the capability of using separate audio.

On the other hand, implementation on the multimedia terminal itself has the advantage that it will work on point-to-point calls not requiring use of a bridge. Both implementations allow audio delay to be performed asymmetrically (i.e., the audio delay is not the same in all directions for all parties).

According to an exemplary embodiment of the present invention, a multimedia conferencing terminal comprises an audio channel for transmitting to at least one other terminal audio information and a monitor that determines if the audio channel is active. A controller controls the amount of delay of the audio being transmitted on the audio channel based on the determination by the monitor.

BRIEF DESCRIPTION OF THE DRAWINGS

So that one skilled in the art to which the subject invention appertains will better understand how to practice the present invention, preferred embodiments of the invention will be described in detail below with reference to the accompanying drawings, in which:

FIG. 2B illustrates an implementation of a teleconferencing communications bridge embodying the principles of the present invention;

FIGS. 3A and 3B depict audio delay vs. time functions according to an embodiment of the present invention;

DETAILED DESCRIPTION OF THE PREFERRED EMBODIMENTS

Figure 1:
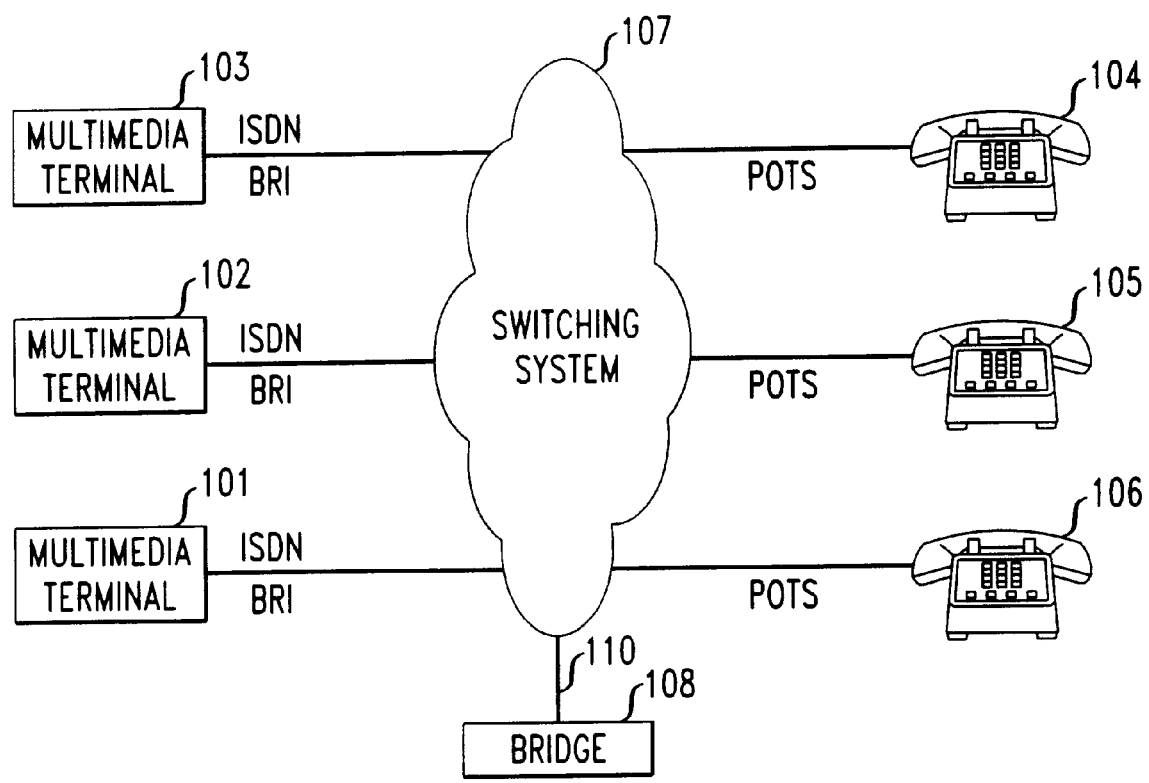
FIG. 1 illustrates a block diagram of a communications network including a teleconferencing communications bridge according to an embodiment of the present invention.

Referring to the drawings in which like reference numerals identify similar or identical elements, FIG. 1 illustrates, in block diagram form, a communications network including a multimedia conferencing bridge arranged according to the principles of the present invention. The communications network of FIG. 1, referred to in general as network 100, concurrently supports multiparty, multimedia conferences for digital user terminals, and single medium audio teleconferences for analog telephone sets.

According to an illustrative multimedia application, digitized audio and video signals from the multimedia terminals are mixed by bridge 108, and the mixed signals are transmitted back to the terminals via switching system 107. (The audio and video generated by a given terminal is typically not included in the mixed signal transmitted back to that terminal). In addition, audio signals received from multimedia terminals 101–103 and telephone sets 104–106 (collectively referred to hereinafter as user terminals 101–106) can be mixed by bridge 108 for transmission to audio only participants in a conference that also includes some users with video.

Switching system 107 may be formed by one switch such as a private branch exchange (PBX), or by a set of interconnected central office (CO) switches and/or Inter-Exchange Carrier (IXC) switches within one or more networks. Accordingly, bridge 108 can be simultaneously connected to several different networks, thereby facilitating interworking among users of those various networks.

Switching system 107 switches incoming audio signals from user terminals 101–106 to bridge 108 and switches audio signals from bridge 108 to user terminals 101–106. Switching system 107 also switches incoming video signals from multimedia terminals 101–103 to bridge 108 and switches video signals from bridge 108 to multimedia terminals 101–103. Switching system 107 is capable of converting analog audio signals received from telephone sets 104–106 to digital format and multiplexing those signals with digital audio signals from multimedia terminals 101–103 for delivery to bridge 108 over facility 110. Various types of such switching systems are known to those skilled in the art. Accordingly, switching system 107 will not be described in detail.

In multimedia applications, bridge 108 can be used as an audio, video and data bridge, although the rest of this specification emphasizes the audio and video features of bridge 108.

Figure 2A:
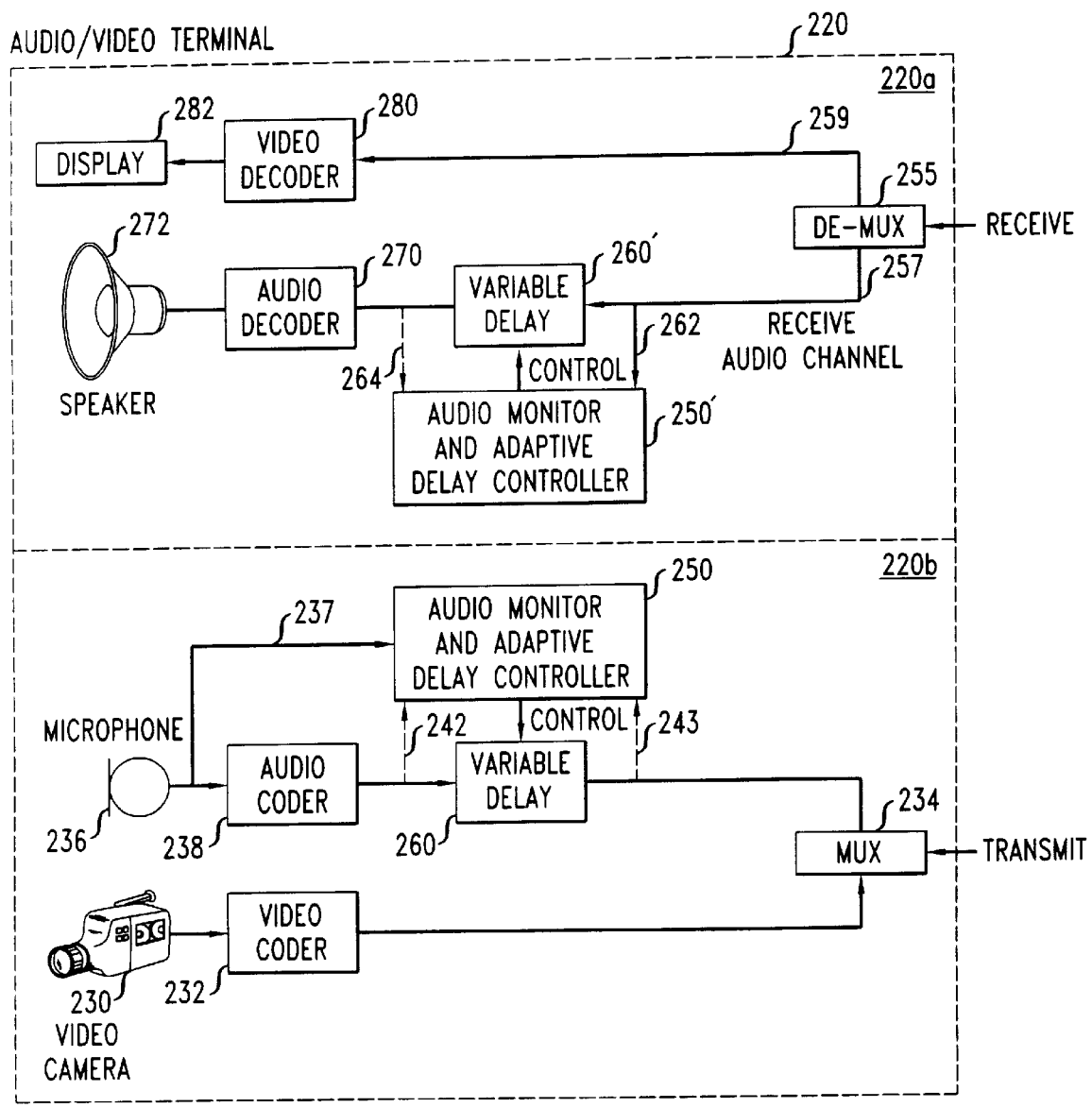
FIG. 2A illustrates a block diagram of a typical audio/video terminal embodying the principles of the present invention.

FIG. 2A depicts an audio/video terminal 220, which is an embodiment of any of the multimedia terminals of FIG. 1. Terminal 220 is comprised of a receive portion 220a and a transmit portion 220b. Terminal 220 differs from a conventional audio/video terminal in that it employs both a variable audio delay unit, e.g., 260, and an audio monitor and adaptive delay controller, e.g., 250, in either transmit portion 220b or in receive portion 220a, or in both portions. A conventional audio/video terminal would only implement a constant audio delay in the audio path. The conventional terminal may allow some user control of the delay value, but the delay value will not adjust automatically.

In the embodiment of FIG. 2A, variable delay units 260 and 260' are utilized in the transmit and receive portions 220b and 220a, respectively, and are controlled by controllers 250 and 250', respectively. (It is understood in an alternate embodiment, a single audio monitor and adaptive delay controller that monitors and controls both the transmit and receive audio channels can be used to replace controllers 250 and 250'). In operation, microphone 236 converts audible sound to an electrical audio signal which is encoded by audio coder 238. The encoded audio output is provided to variable audio delay unit 260 where it is delayed by an amount controlled by controller 250. Controller 250 monitors the audio signal energy and determines the audio delay required based upon, for example, the duration of sound or silence, as will be discussed in further detail below. The audio signal is preferably monitored by controller 250 before it is coded, as indicated by line 237. Alternatively, controller 250 can monitor the audio after being coded, both before and after the delay as indicated by dotted lines 242 and 243. In some cases, the coder 238 may include the Analog to Digital Conversion (ADC) function. In cases where there is a separate ADC and coder, the input to controller 250 could be taken after the ADC but before the coder.

In the video path on transmit, video camera 230 provides captured image information to video coder 232 where it is coded. Multiplexer 234 multiplexes the encoded video from video coder 232 with the encoded and delayed audio output of the variable delay unit 260. The multiplexed audio/video data stream is then modulated and transmitted to either an audio/video bridge or directly to another multimedia terminal.

In the receive path of terminal 220, multiplexed audio/video data is received by demultiplexer 255 where it is demultiplexed such that audio data is provided on line 257 and video data is provided on line 259. The receive audio data is applied to variable audio delay unit 260', which delays the audio by an amount controlled by controller 260'. Controller 260' monitors the audio signal energy to determine an appropriate amount of delay. Preferably, the audio energy is monitored via line 262 before the delay, or alternatively, via line 264. The delayed audio is decoded by audio decoder 270 and then converted to sound by speaker 272. In the video path, the video data on line 259 is decoded by video decoder 280 and then displayed by display 282. It is noted that in some cases it may be easier to place the audio decoder before the variable delay and monitor/controller.

FIG. 2B illustrates in block diagram form, an audio/video bridge 108a, which is an embodiment of bridge 108 of FIG. 1. The video bridge portion of bridge 108a is assumed to be conventional and is therefore omitted from the figure. The video bridge typically operates to receive the video data transmitted from each of the multimedia terminals and to transmit the video data of one or more of the participants back to the multimedia terminals.

In operation of the audio bridge portion, the audio transmitted by each of N multimedia terminals in the conference is applied to both a multi-channel audio monitor 292 and to a multi-channel audio delay unit 290. Delay unit 290 has N delay paths, one for each audio channel. Monitor 292 provides N output signals to an adaptive audio delay controller 294 where each output signal is indicative of the audio signal energy transmitted by an associated one of the N terminals (i.e., the audio energy on the audio output channel). Adaptive delay controller 294 then determines an optimum audio delay for each individual audio path, which may be based on the duration of speech or silence on the corresponding audio channel, as well as the audio activity on the other channels. Control signals are then provided to multi-channel audio delay unit 290, which responds by implementing the audio delay determined for each path. The delayed audio signals are applied to audio mixer 296 where they are mixed in a conventional manner such that the audio transmitted back to each terminal consists of the audio generated at all or some of the other terminals of the conference. Each video signal destined for transmission back to each terminal is multiplexed with the corresponding audio signal by a multiplexer (not shown) and the multiplexed signals are then transmitted from the bridge 108a. It is noted that the multi-channel audio monitor 292 may also be utilized to implement video floor control. In this case, monitor 292 would provide further output signals to the video bridge portion to control which talker has the "floor" and thus, which video is to be transmitted back to each terminal.

It has been shown that audio conference subjective quality degrades rapidly for audio delays of over approximately 150 ms. In addition, it has been shown that audio/video sync slip may not become objectionable until the difference between audio signal delay and video signal delay is over several hundred milliseconds, depending on the application. In other words, while audio signal delay of over approximately 150 ms is detrimental to perceived audio conference quality, there is a certain degree of tolerance to audio/video sync slip. Even though audio/video sync slip may at times be objectionable, particularly during a conference when an extended period of monologue is occurring, it becomes less objectionable during highly interactive periods of the conference. Human factor experiments requiring subjects to perform a task using a video terminal have shown that when audio delay is inserted to provide lip sync, interactions become formal and unnatural, humor becomes infrequent, and there are frequent breakdowns in the conversation, i.e., both parties start to speak at the same time, back off, and try again. When the audio delay is cut back, keeping the video delay constant, the conversation becomes much more lively and natural, humor re-appears, and there are fewer breakdowns in conversation. Accordingly, the present invention seeks to optimize these factors by automatically controlling the amount of audio signal delay based on conference dynamics.

There are various methods that can be used to determine conference dynamics. For example, the audio channel can be monitored to determine the pattern of voice activity. An audio channel monitor can monitor a single channel or multiple audio channels, and it can reside either on the user terminal (as exemplified by audio monitor/controllers 250, 250' of FIG. 2A) or on a bridge (as exemplified by multi-channel audio monitor 292 of FIG. 2B). Audio delay can be inserted on the terminal, on either the audio input or output channels, or both, or it can be inserted on the bridge. Any combination of these configurations may be used. In any case, the audio energy monitor would determine the conference dynamics according to a certain algorithm, and set the audio delay accordingly. Delay can be symmetrical, i.e., each participant's audio signal gets delayed by the same amount. Delay can alternatively be asymmetrical—e.g., in a monologue state, the talker's audio could be delayed to provide lip sync, whilst the return audio paths could be undelayed, so that listeners could ask questions without the questions being delayed.

Accordingly, various embodiments of the present invention are based on various configurations of monitoring audio activity and controlling audio delay. These embodiments can be implemented either on a bridge or on the user terminal. Implementation on the bridge has the advantage of working with "dumb" terminals not having the ability to monitor audio activity and provide delay accordingly. However, when implemented on the bridge, each of the terminals must be capable of turning off any internal audio delay.

On the other hand, implementation on the terminal itself has the advantage that it can be used even on point-to-point calls not using a bridge.

It should be noted that the term "lip sync" as used herein does not necessarily mean absolute synchronism between the audio signal and video signal. Instead, "lip sync" can mean perceptual lip sync in which the audio signal delay may be slightly different than the video signal delay although the viewer and listener will still perceive virtual lip sync.

As noted above, embodiments of the present invention may be implemented directly on multimedia terminals 101–103. Examples of multimedia terminals suitable for implementing embodiments of the present invention include multimedia terminals such as those manufactured by PictureTel and Lucent Technologies, or video conference systems based on standard personal computers, e.g., Intel's Proshare system. In addition, the present invention may be implemented directly on audio-only communication equipment utilizing separate video communication equipment. Of course, it should be clear that in any of the embodiments of the present invention as described herein optional data transmission capabilities may also be provided.

Various embodiments of the present invention implemented by utilizing the terminal itself will now be described.

According to an embodiment of the present invention as shown in FIG. 1, multimedia terminals 101–103 are arranged for a three-way multimedia conference. Of course, it should be understood that any number of multimedia terminals can be provided in the multimedia conference. Each multimedia terminal is capable of monitoring the audio signal it is sending out and determining whether it detects silence or speech. If silence is detected by a terminal on its outgoing audio, then the outgoing audio delay is set to a predetermined minimum value (e.g. less than 100 ms). If speech is detected on the outgoing audio and continues for some time, then the talker is assumed to be entering into a monologue and the outgoing audio delay is increased. For example, as shown in FIG. 3A, the audio delay is initially set for minimum delay (M). Since audio delay becomes noticeably harmful to interactivity at about 150 ms of audio delay, a suitable value for M would be in the 0 to 100 ms range. After the user has talked for a predetermined period of time ($t_1$), the audio delay is gradually increased, with the rate of increase being represented by the slope of the curve. The outgoing audio delay is gradually increased until perceptual lip sync (L) is achieved, where the audio delay is substantially equal to the video delay. A typical value for video delay on video conference terminals (e.g., those manufactured by PictureTel and Lucent Technologies Inc.) running at the Integrated Services Digital Network (ISDN) basic rate of 128 Kbits per second is 400 ms. Thus a suitable time for L would be in the 300 ms to 400 ms range. Time ($t_1+t_2+t_3$) represents a period of time in which the user is actually speaking. The time immediately after ($t_1+t_2+t_3$) represents a period of silence. When a predetermined period of silence $t_4$ expires, the audio delay returns to minimum level (M). Each terminal performs this function. Accordingly, the effect is that after one participant speaks for a sufficient period of time, his/her audio will be delayed until it reaches the appearance of lip sync. This algorithm is relatively simple, relies on monitoring only a single channel, and will provide benefit regardless of whether the same algorithm is running on the other terminals or not. However, maximum benefit will result when all parties to the conference run the same algorithm. The resulting system has asymmetric audio delay: in a monologue, only the talker's voice is delayed; however, interruptions and questions will get through with minimal delay. As each speaker falls silent to let someone else talk, then their audio will no longer be delayed. All users will have their audio minimally delayed until someone speaks for a sufficient period of time to allow their audio delay to increase as described above.

The performance of the above system is determined by the three time constants $t_1$, $t_2$, and $t_4$, and by the delay values M and L. The time $t_1$, represents the onset of monologue, and typically would be several seconds to over ten seconds. The time $t_2$ is chosen to allow the delay to gradually build up without being noticeable. The buildup may be smooth or in small steps, as depicted in FIG. 3B, which may in turn be synchronized with intersyllabic gaps in the speech. A suitable time for $t_2$ would be five to ten seconds, so that the buildup of delay is not perceptible to the listeners. The time $t_3$ represents the time that the talker is talking, after $t_2$ elapses. Time $t_3$ is not a system parameter. Time $t_4$ is a predetermined period of silence and should be long enough to allow for natural pauses in the speech. In a simple system that monitors just a single channel, a range of 5 to 20 seconds would be suitable for $t_4$. In a more sophisticated implementation, the talker could stay in the monologue state indefinitely until another person starts talking. This implementation would allow a talker to stay in monologue mode through lengthy silences, for example, while demonstrating something over the video or data channels. Monitoring other channels also allows $t_4$ to be reduced so that, when another talker starts talking, the system makes a fast transition to interactive mode. However $t_4$ needs to be at least equal to L, otherwise speech already in the delay pipeline will get flushed out and will not be delivered.

Audio delay can also be managed by each terminal by monitoring the incoming audio received from the other terminals (receive audio). According to this embodiment of the present invention, each multimedia terminal such as terminal 220 of FIG. 2A has the capability of monitoring the receive audio to determine if one or more speakers at one or more terminals are actively speaking or if silence is presently occurring on the incoming audio channel. Each multimedia terminal also has the capability of controlling the amount of audio signal delay of the transmit audio (being transmitted to the other terminals). If a terminal determines that speech is occurring on the receive audio channel, it decreases the amount of audio signal delay of the transmit audio, thereby achieving more natural conference quality. On the other hand, if a terminal determines that silence is presently occurring on the receive audio channel, the audio delay of the transmit audio is increased to achieve perceptual lip sync. All terminals make these determinations and control their own audio signal delay accordingly.

In a point-to-point embodiment of the present invention, audio signal delay can be managed by only one of the multimedia terminals in both the outgoing (transmit) and incoming (receive) directions. If, for example, terminals 102 and 103 of FIG. 1 are arranged in a point-to-point multimedia conference and terminal 103 includes the capabilities for determining conference dynamics and terminal 102 does not (e.g., terminal 103 is a "smart" terminal and terminal 102 is a "dumb" terminal), terminal 103 can manage the audio signal delay for the audio being transmitted to terminal 102, as described above. In addition, terminal 103 can also control the amount of audio signal delay for the audio being received from terminal 102. This can be accomplished in one of several different ways.

For example, if terminal 102 has the capability of turning off all of its audio delay for the audio it is transmitting, the amount of audio signal delay of the audio being received at terminal 103 from terminal 102 can be controlled by terminal 103. That is, if terminal 103 determines that its output audio channel is silent but its audio input channel is active, monologue is occurring. Accordingly, the audio signal being input to terminal 103 from terminal 102 can be delayed a predetermined amount of time to achieve perceptual lip sync. On the other hand, if terminal 103 determines that interactive speech is occurring, the audio signal input from terminal 102 can be directly output at terminal 103 with virtually no delay.

A multimedia terminal could also have the capability of having it's output audio signal delay controlled by an external device. In this case, if terminal 102 has this capability, terminal 103 can be used to control the amount of delay of the audio signal being output by terminal 102 based on conference dynamics.

The present invention can thus be used by each endpoint terminal to manage the amount of audio signal delay for itself. In addition, if one or more "dumb" terminals not having the capability of adaptively controlling their own audio delay are used, the "smart" terminal can manage the amount of audio signal delay for the audio that it is transmitting and also manage the amount of audio signal delay for the audio from the "dumb" terminals.

Figure 4:
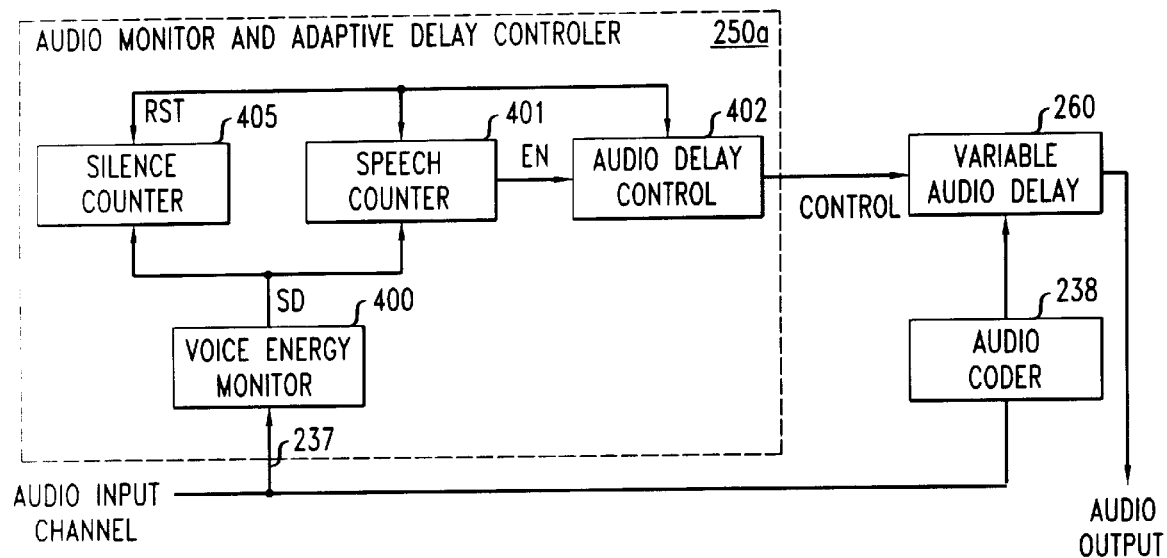
FIG. 4 illustrates in block diagram form, an embodiment of an audio monitor and adaptive delay controller in accordance with the invention.

FIG. 4 depicts in block diagram form an audio monitor and adaptive delay controller 250a, which is an embodiment of either controller 250 or 250' of FIG. 2A. Although depicted in block diagram form for ease of description, it should be noted that each of these functions could be implemented by a microprocessor or Digital Signal Processor (DSP) provided in the terminal or bridge. Voice energy monitor 400 monitors voice energy on the audio input channel via line 237 and provides an output logic signal SD indicative of detected speech or silence. The output signal SD is provided to both a silence counter 405 and a speech counter 401. When signal SD is at a first logic state indicative of speech, speech counter 401 increments a speech count. When speech counter 401 reaches a predetermined count corresponding to time $t_1$, (see FIG. 3A), it issues enable signal EN which enables audio delay control circuit 402 to begin incrementing the audio delay. That is, audio delay control 402 begins increasing the audio output delay in an incremental manner until perceptual lip sync (L) is achieved as depicted in FIG. 3B, for example. When monitor 400 detects silence, signal SD switches to the opposite logic state and silence counter 405 begins counting. When silence counter 405 reaches a predetermined count corresponding to time $t_4$ indicating that a relatively large interval of silence on the audio input channel 410 has occurred, silence counter 405 issues a reset command RST which resets speech counter 401 and sets audio delay control 402 to minimum audio output delay (M).

Figure 5:
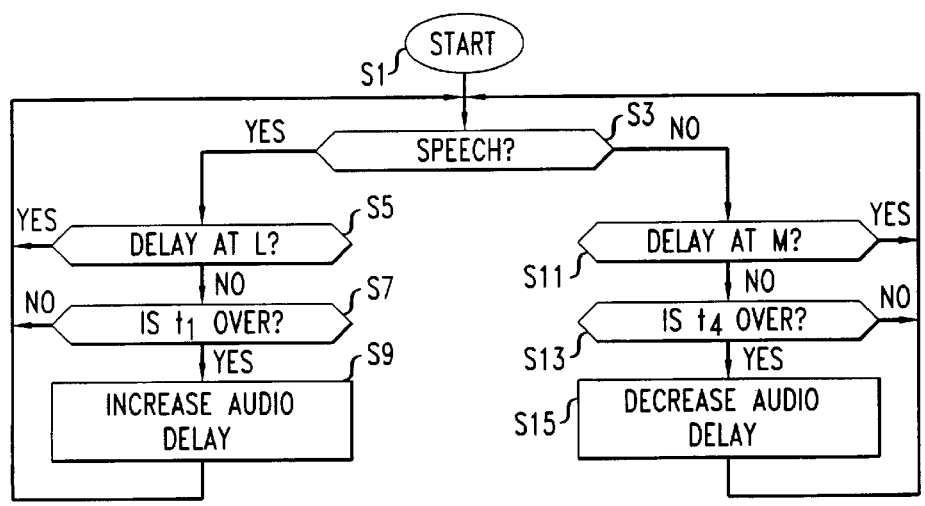
FIGS. 5 and 6 illustrate flow charts of methods for implementing audio delay according to embodiments of the present invention.

A method of implementing the present invention utilizing a single channel is also described by reference to the flow chart of FIG. 5. In step S1, all variables and registers are initialized. In step S3, a determination is made by the terminal as to whether speech is occurring on the audio channel. If yes, in step S5 a determination is made as to whether the present audio delay is at level L (see FIG. 3), the optimal maximum level of audio delay. If yes, the flow returns to step S3. If no, in step S7 a determination is made whether time period $t_1$ (i.e., the predetermined time period between the start of speech and the start of audio delay control) has expired. If no, the flow returns to step S3. If yes, in step S9, the audio delay of the output audio is increased by an incremental amount and the process returns to step S3. If no in step S3, a determination is made in step S11 whether the output audio signal delay is set to a minimal level of audio delay (M). If yes, the process returns to step S3. If no, it is determined in step S13 if time $t_4$ (i.e., the time from the end of speech to the removal of audio delay) has occurred. If no, the process returns to step S3. If yes, the output audio signal delay is decreased in step S15 to level M and the flow returns to step S3. According to this method of implementing the present invention, the audio signal delay can be controlled by monitoring a single channel (e.g., the receive audio channel or transmit audio channel). This method could also be implemented to monitor both the receive and transmit audio channels to determine conference dynamics and control audio delay accordingly.

Referring again to FIGS. 2B and 4 together, the N-channel audio monitor 292 can be comprised of N voice energy monitors 400, each monitoring the audio from one of the multi-media terminals, and each providing an output logic signal SD to the adaptive audio delay controller 294. Likewise, the delay controller 294 can be comprised of N silence counters 405, N speech counters 401, and N audio delay controllers 402, each associated with one of the audio channels. Each of the N output signals SD from monitor 292 would then be applied to one silence counter and one speech counter, such that an associated audio delay controller 402 can control the audio delay in the corresponding audio channel. This arrangement enables each of the audio channels to be monitored and delayed independently. Preferably, however, the audio delays of each channel are also based upon the speech activity occurring on the other channels. As such, delay controller 294 includes software which provides each audio delay controller 402 with data regarding the audio delays and speech activity on the other channels. Practically, all of the silence counters 405, speech counters 401 and audio delay controllers 402 within delay controller 294 are realized by a single software program and associated digital hardware, such that the audio delay control of each channel can readily take into account the audio delay and speech occurring on the other channels.

An improved method of adjusting the audio delay of each of the multiple audio channels using the bridge 108a that takes more than one channel into account will now be described with reference to FIG. 6. With this method, the audio delays of the multiple channels can be adjusted either simultaneously or sequentially. The flow steps of FIG. 6 refer to the audio delay adjustment of any given one of the audio channels (hereafter, the "ith" audio channel). In step S1, all variables and registers are set to their initial values. In step S3, a determination is made if speech is actively occurring on the ith audio channel. If yes, in step S5 a determination is made if the audio signal delay of the ith channel is at an maximum level (L). If yes, the process returns to S3. If not, the process proceeds to step S7 where it is determined if time period $t_1$ is over. If not, the flow returns to step S3. If yes, in step S9 it is determined if the audio occurring on any of the other channels is being delayed. The reason for this is that a delay on any other channel implies that others are talking or have just stopped talking. As such, the current (ith) talker is either interrupting or double-talking. In either case, it is desirable to keep the delay of the ith channel low. Therefore, if yes in step S9, the delay is not increased and the flow returns to step S3. If no in step S9, then in step S11 the audio signal delay is incrementally increased and the flow returns to step S3.

In step S3, if speech is not occurring on the ith channel, then in step S13 it is determined whether the audio signal delay is at minimal level M. If yes, the flow returns to step S3. If not, in step S15 it is determined if the predetermined time from end of speech to removal of audio delay (e.g., time $t_4$) is over. If not, the flow returns to step S3. If yes, it is determined in step S17 if another party is talking on any of the other channels. If no, the flow proceeds to step S3. That is, if nobody else is speaking any of the other channels, the delay of the ith channel is maintained at level "L"—the perceptual lip synch level. This allows a person delivering a monologue to fall silent for long periods of time without ramping up and down the delay for each silent period—so long as nobody else speaks. This represents an improvement over the single channel case discussed above. If speech is occurring on one of the other channels in step S17, the audio signal delay is decreased in step S19 to level M and the flow returns to step S3. Accordingly, multiple channels can be monitored to determine conference dynamics.

Figure 6:
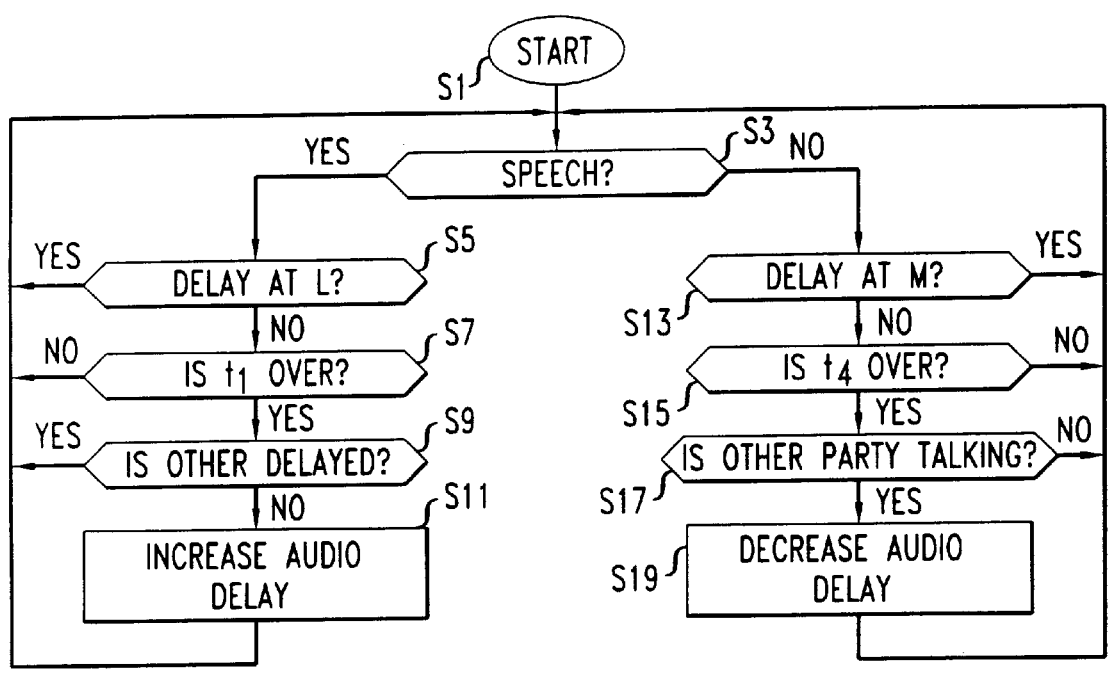

It is noted that the method of FIG. 6 can also be utilized in a point to point communication between two multimedia terminals without a bridge. That is, the audio delay adjustment of each of the two audio channels, whether it takes place at one smart terminal or at both terminals, would take into account the current speech activity on both channels. Consequently, during periods of interactivity the audio delay on each channel would generally be lower than during periods of monologue.

As noted above, various embodiments of the present invention monitor the voice energy of an audio signal to determine whether silence or active speech is occurring. The amount of time a channel must be inactive to be considered "silent", and the amount of time a channel must be active to be considered "speech" are two separate parameters to be considered. According to an embodiment of the present invention, the parameters of the curve depicted in FIGS. 3A and 3B are predefined. However, it is possible to allow a user of the terminal to custom control the parameters of the curve depicted in FIGS. 3A and 3B, to allow each user to selectively tailor the curve to his particular use. In addition, it is also possible to adaptively set the parameters based on an event or events. For example, it may be desirable to change audio delay quickly (e.g., increase the slope of the curve in FIG. 3A), if a large number of floor changes is occurring, in order to accelerate the process of entering the monologue state.

In addition, although depicted in FIGS. 3A and 3B as steps, it is of course possible to vary the audio delay steadily and continuously or in any amount of steps. In addition, it is also possible to implement the present invention utilizing only one step. That is, the delay is either set to minimum delay or to maximum delay directly, depending on conference dynamics. The delay changes can be implemented either during periods of silence or at any other time, depending on the desired quality of speech required. For example, it is possible to use a time-based expansion technique to slow down speech without changing the pitch. However, this technique tends to reduce or otherwise alter the quality of the audio.

In a conventional video bridge, voice energy is monitored and is used to determine which speaker has the "floor". Only one talker has the floor at any instant in time, and broadcasts video to all other parties in the conference. A floor change occurs when a different talker begins speaking and is given the floor. In another embodiment of the present invention the floor change events are used as an indication of interactivity in the conference and the audio delay controlled accordingly. For example, if more than a predetermined number of floor changes have occurred within a predetermined period of time, it is determined that the conference is interactive and the audio delay on all of the channels is reduced to some fixed value lower than that of the video delay. On the other hand, if it is determined that the conference is not interactive (i.e., a monologue is occurring), the amount of audio delay is increased to achieve perceptual lip sync. Floor change monitoring preferably takes place at the bridge. In the alternative, the floor changes can be manually input by a user at each multimedia terminal, with the manually input floor changes being monitored and kept track of at the bridge. In addition, a well known 3-talker rule can be implemented at the bridge to determine floor change events. The three talker rule, or equivalent, is a method of improving audio quality in a large audio conference. If audio from all the participants was included in the audio mix generated in the bridge, a lot of noise build up would occur from a variety of sources, such as coughing, the closing of doors, the rustling of papers, etc. By limiting the mix to three active talkers, such noise build up can be prevented. Implementation of the three talker rule requires monitoring of the audio inputs to the bridge, e.g., by multi-channel monitor 292 (FIG. 2B).

Figure 7:
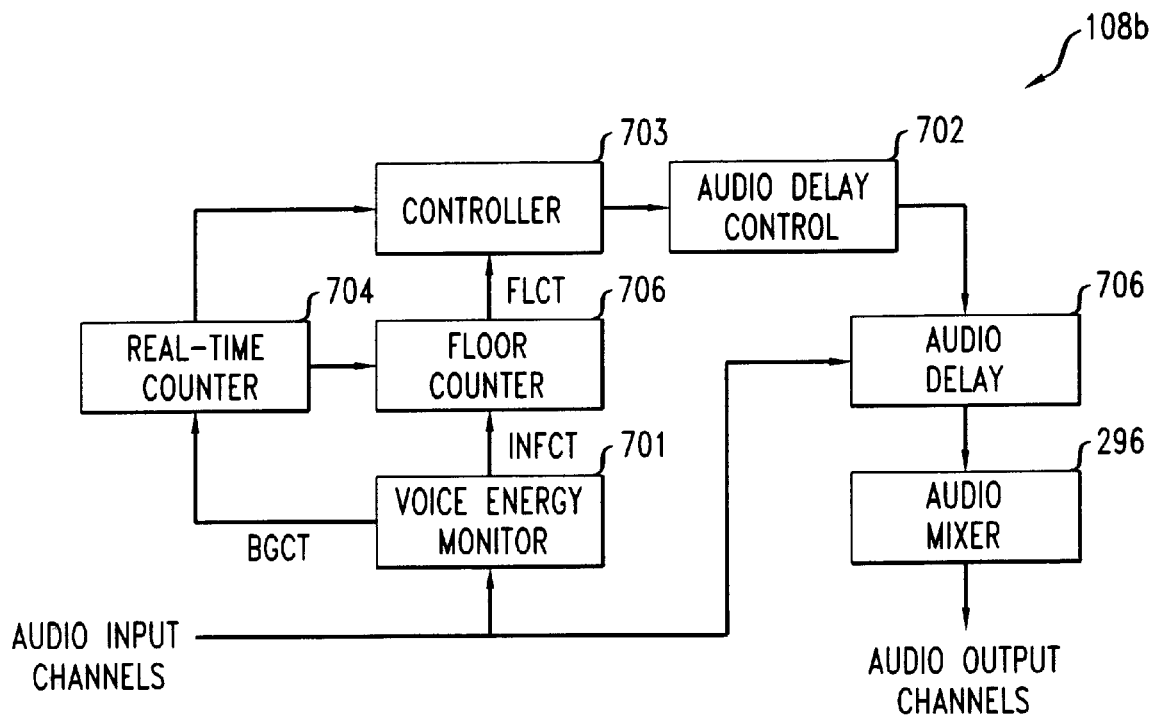
FIG. 7 illustrates in block diagram form, the audio portion of an audio/video bridge that uses "floor" change events to determine talker activity and control audio delay accordingly.

FIG. 7 is an illustrative representation of a bridge 108b that uses floor change events to determine conference dynamics so that the audio delay can be controlled accordingly. As depicted in FIG. 7, voice energy monitor 701 monitors voice energy on the channels and determines when a floor change has occurred. Voice energy monitor 701 issues a begin count signal BGCT to real time counter 704 at the time a first floor change is detected, enabling counter 704 to begin counting. Each time a floor change occurs, voice energy monitor 701 issues an increment floor count signal INFCT to increment floor counter 705. Floor counter 705 keeps track of the number of floor changes that have occurred. After real time counter 704 counts to a predetermined value indicating that a predetermined time interval has elapsed, it issues a signal to controller 703 which then determines from floor count signal FLCT whether N or more floor changes have occurred during the predetermined time interval. If N or more floor changes have occurred, it is determined that the conference is in interactive mode. Controller 703 then issues a command to audio delay control circuit 702 to lower the audio delay being implemented by audio delay 706 to some predetermined value lower than the video delay. On the other hand, if controller 703 determines that less than N floor changes have occurred during the predetermined time interval it is determined that monologue is occurring. Controller 703 then issues a command to audio delay control circuit 702 to increase the audio delay being implemented by audio delay unit 706 to achieve perceptual lip sync.

Figure 8:
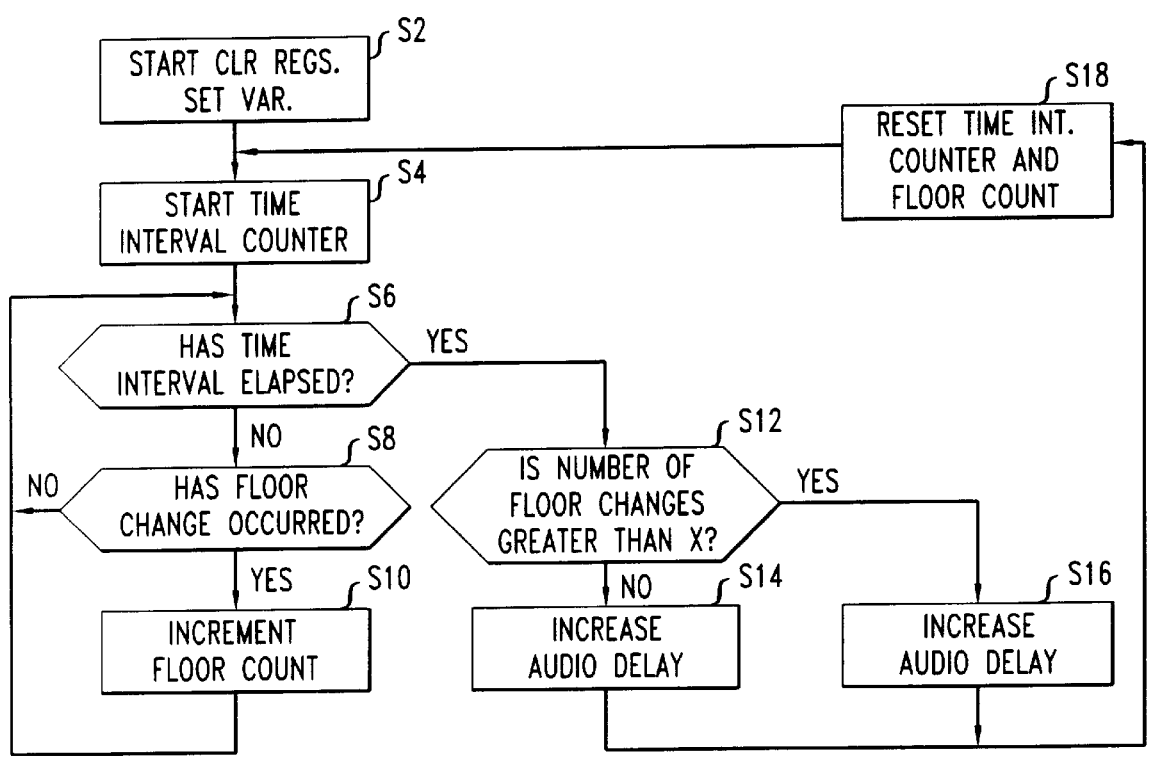
FIG. 8 illustrates a flow chart of an algorithm for implementing audio delay according to an embodiment of the present invention.

A method for implementing this embodiment of the present invention is depicted in FIG. 8. The procedure begins in step S2 in which all registers are cleared and any variables are set to initial predetermined values. In step S4, a time interval counter is enabled to begin counting. In step S6, a determination is made whether a predetermined time interval has elapsed. If No in step S6, a determination is made in step S8 as to whether a floor change has occurred. If no floor change has occurred the process returns to step S6. If a floor change has occurred, the floor count is incremented in step S10 and the process returns to step S6. When it is determined in step S6 that the predetermined time interval has elapsed, the process proceeds to step S12. In step S12, a determination is made whether more than a predetermined number of floor changes has occurred. If more than the predetermined number of floor changes have occurred, it is determined that the conference is interactive and the process proceeds to step S16 in which the audio delay is reduced. If less than the predetermined number of floor changes have occurred, it is determined that the conference is monologue and the audio delay is increased in step S14 to achieve perceptual lip sync. In either case, the process proceeds to step S18 in which the time interval count and the floor count are reset. The process then returns to step S4. It should be noted that because the individual multimedia terminals may not have access to the information indicating the "floor" change events, this embodiment of the present invention is best implemented on bridge 108b.

The ITU-TS recommendation H.320 suggests that audio/video terminals delay the audio on both the receive and transmit directions to match their own video decode and encode delays, respectively, resulting in correct end-to-end lip sync regardless of the manufacturer of the far end equipment. Accordingly, if a terminal including an embodiment of the present invention (i.e., a "smart" terminal) is communicating with a terminal not including an embodiment of the present invention (i.e., a "dumb" terminal), the "smart" terminal does not have to account for any audio signal delay changes that may be introduced by the dumb terminal. However, if a first smart terminal is communicating with a second smart terminal, it is necessary that each of the terminals know what audio signal delay, if any, the other smart terminal may be adding to or removing from the audio. In similar fashion, it is important that each terminal know, or be able to determine, what audio signal delay, if any, is being introduced by any bridge or network in the system.

Accordingly, one potential problem that must be addressed for implementing the present invention, is how one piece of equipment can determine the delay characteristics of the other pieces of equipment it is connected to. In other words, how does a bridge or network know what audio signal delay is being introduced by each of the terminals, or how does one terminal know what delay is being introduced by other terminals and/or the bridge or network. This problem can be solved in several different ways. For example, each terminal can assume that each of the other terminals are operating in accordance with ITU-TS recommendation H.320 to achieve lip sync. Each terminal can then control its own audio delay depending on conference dynamics. This approach will provide an optimum solution when connected to other "smart" terminals, and still improve on the conventional performance when connected to "dumb" terminals.

Another solution is that each terminal user can manually set what the audio signal delay is for the other terminals that it is communicating with. However, this solution requires that each terminal have the capability of having its audio signal delay controlled by an external device (i.e., by another terminal communicating with it).

Yet another solution is that each piece of equipment can test the other pieces of equipment connected to it to determine the audio delay of each piece of equipment. The audio signal delay of the audio being transmitted to the other terminal and the audio signal delay for audio being received from each terminal can then be controlled accordingly.

Another method is that the users of the terminals involved in a conference can select from preset modes of common values and other known equipment choices to select a predefined audio delay. Each terminal can then operate accordingly.

In an alternative method, each terminal user can be required to register with a service and make known the information regarding the terminal's audio delay. That information can then be polled by each terminal, prior to initiating a multimedia conference and the information can be downloaded.

Yet another method includes a handshake protocol that is performed between each piece of equipment to be involved in the conference prior to the multimedia conference beginning. The handshake protocol allows each terminal to communicate information to each of the other terminals regarding audio signal delay. Each terminal can then control audio delay accordingly, based on that information.

Another problem that must be addressed is how to turn off delay that is being added by other equipment. This can be accomplished by 1) manually setting the audio delay of all of the equipment using a specific equipment interface, 2) using a separate phone line for audio, or 3) by performing a special handshaking protocol to tell other terminals to turn off their audio delay.

According to the above-described embodiments of the present invention, an audio channel monitor is used to monitor the voice channels and determine if speech or silence is occurring. Various methods are available for monitoring audio activity. Different monitors answer different questions. For example, a) Is the audio channel active or silent? b) Is the audio signal speech or some other sound such as music or noise? c) How loud is the audio signal?

For purposes of the present invention, it is sufficient to determine simply if the audio channel is active or silent. It is generally not necessary to differentiate between speech and non-speech audio, although it is important not to mistake environmental noise for an active channel.

Audio channel monitoring for the above-noted embodiments of the present invention can be implemented using what is commonly referred to as the "leaky bucket" algorithm. This algorithm is well known in the art. It may be implemented either in the analog domain or in the digital domain, for example in a Digital Signal Processor.

A mathematical description of the process is as follows. Assume that the audio signal is sampled at a regular interval, e.g. 8000 samples per second, and the voltage of each sample is represented by the variable s. Variable C represents the current energy level. Each sample period a new value for C is calculated by adding the magnitude of the new sample to the previous value of C and multiplying the result by a decay constant $\alpha$ that is slightly less than one, i.e., $C_t = (C_{(t-1)} +_{13} S\_) \times \alpha$.

In addition, there are two thresholds, a high threshold $T_h$ and a low threshold $T_1$, where $T_h > T_1$. Every time the current energy level C crosses $T_h$ while the current signal level is rising, an "audio going on" event is generated, and an audio active state is entered. Conversely, every time the current energy level C crosses the low threshold $T_1$ going down, an "audio going off" event is generated, and an audio inactive state is entered.

This process is characterized by the value of the two thresholds and the constant $\alpha$. By manipulating these three values, the algorithm can be made more or less sensitive, and respond faster or slower to variations in the audio volume. This is analogous to a bucket of water with a small hole in the bottom. Water leaks out of the hole at a speed proportional to the level of water (and hence the pressure). Water pours into the bucket from a faucet at a rate which represents the instantaneous intensity of the audio signal. Two marks on the side of the bucket represent the two thresholds $T_h$ and $T_1$. If the audio is on continuously at a high volume, the level in the bucket will rise to a constant level at which the water flows out of the hole at the same rate at which it flows in. When the audio goes off, the water will gradually leak out until the bucket is empty. This process can be further improved by adapting thresholds $T_h$ and $T_1$ to talker level.

In addition to the above-described embodiments in which the audio delay is varied according to the video delay, it is also possible to vary the video delay instead of the audio delay. A tradeoff could be made in the video coding between quality and delay. For example, the video coding could automatically be modified during long periods of monologue to provide better video quality at a cost of longer video delay. On the other hand, the video coding could be modified during interactive periods to provide poorer video quality but a shorter video delay.

It will be appreciated that the foregoing description and drawings are only intended to be illustrative of the present invention. Variations, changes, substitutions and modifications of the present invention may occur to those skilled in the art without departing from the spirit and scope of the present invention. Accordingly, it is intended that the present invention be limited only by the scope of the appended claims.

What is claimed is:

1. A multimedia conferencing system comprising:
   a plurality of multimedia terminals, each of said multimedia terminals comprising:
      an audio channel for transmitting audio information to at least one other multimedia terminal of said plurality of multimedia terminals;
      a monitor for determining if the audio channel is active; and
      a controller for controlling an amount of delay of the audio being transmitted on the audio channel based on the determination by the monitor; and
      a bridge for receiving the audio information from said audio channel and transmitting the audio information received thereat to said at least one other multimedia terminal, wherein the bridge uses a number of floor changes occurring within a predetermined amount of time to determine the number of multimedia terminals having users that have been actively speaking in the multimedia conference.

2. The multimedia conferencing system according to claim 1, wherein the monitor monitors the audio being transmitted on the audio channel to determine if silence or active speech is occurring.

3. The multimedia conferencing system according to claim 2, wherein when the monitor determines that active speech has been occurring for longer than a predetermined amount of time, the audio delay is increased with respect to a video delay in a corresponding video channel.

4. The multimedia conferencing system according to claim 2, wherein when the monitor determines that silence has been occurring for longer than a predetermined period of time, the audio delay is decreased with respect to a video delay in a corresponding video channel.

5. The multimedia conferencing system according to claim 3, wherein the audio delay is gradually and steadily increased until at least perceptual lip sync is achieved with a corresponding image being transmitted in said video channel and having said video delay.

6. The multimedia conferencing system according to claim 3, wherein the audio delay is gradually increased in steps until at least perceptual lip sync is achieved with a corresponding image being transmitted in said video channel and having said video delay.

7. The multimedia conferencing system according to claim 1, wherein the monitor comprises a voice energy monitor for monitoring voice energy of audio on the audio channel.

8. The multimedia conference terminal according to claim 2, wherein said controller comprises:
   a silence counter for counting duration of silence responsive to an output signal of said monitor;
   a speech counter for counting duration of speech responsive to an output of said monitor; and
   an audio delay controller coupled to said silence and speech counters for controlling said amount of delay based on duration of silence and speech as determined by said counters.

9. A multimedia conferencing terminal comprising:
- at least one output audio channel for transmitting to at least one other terminal audio information via a bridge;
- at least one input audio channel for receiving from the at least one other terminal audio information via said bridge;
- at least one monitor for determining if the audio channels have been active; and
- a controller for controlling delay of the audio being transmitted on the at least one output audio channel based on the determination by the monitor, wherein the bridge uses a number of floor changes occurring within a predetermined amount of time to determine the number of multimedia terminals having users that have been actively speaking in the multimedia conference.

10. The multimedia conferencing terminal according to claim 9, wherein said controller is also operable to control audio delay on the input audio channel based on the determination by the monitor.

11. The multimedia conferencing terminal according to claim 9, wherein when the monitor determines that only one of said audio channels has been active for longer than a predetermined period of time, the audio delay is increased until perceptual lip sync is reached.

12. The multimedia conferencing terminal according to claim 11, wherein when the monitor determines that silence has been occurring on a particular channel for longer than a predefined period of time, the audio delay is decreased to be lower than a corresponding video delay.

13. The multimedia conferencing terminal according to claim 9, wherein when the monitor determines that active speech has been occurring on both channels, the audio delay on at least the output channel is set lower than corresponding video delay.

14. A multimedia conferencing system comprising:
- a plurality of multimedia terminals each transmitting and receiving video data and audio data, the transmitted video data being coded at transmitting ones of said terminals and subsequently decoded at receiving ones of said terminals wherein a video delay is introduced; and
- a bridge for receiving the audio and video data from the transmitting multimedia terminals, and transmitting the video and audio data received thereat to the receiving multimedia terminals, said bridge using a number of floor changes occurring with a predetermined amount of time to determine the number of multimedia terminals having users that have been actively speaking in the multimedia conference, wherein when users of more than one of the multimedia terminals have been actively speaking in the multimedia conference, audio delay is decreased below that of video delay of corresponding video, and when a user of only one of the multimedia terminals is actively speaking in the multimedia conference for a predetermined amount of time, the audio delay is increased to substantially match the video delay.

15. The multimedia conferencing system according to claim 13, wherein when the bridge determines that the number of floor changes is greater than a predetermined number, the audio delay is decreased below that of the video delay.

16. The multimedia conferencing system according to claim 13, wherein when the bridge determines that the number of floor changes is less than a predetermined number, the audio delay is increased to substantially match the video delay.

17. The multimedia conferencing system according to claim 14, wherein the bridge comprises an audio portion and a video portion, said audio portion including:
- a multi-channel audio delay unit having a plurality of delay paths each coupled to an audio output channel of one of said multimedia terminals;
- a multi-channel audio monitor coupled to audio output channels of said multimedia terminals and operative to provide a plurality of output signals each indicative of audio activity occurring on a corresponding one of said audio output channels;
- an adaptive audio delay controller connected to receive each of said output signals from said monitor and to provide control signals, based on said output signals, to said audio delay unit to control delay in said delay paths; and
- an audio mixer coupled to said delay unit for mixing audio from said delay paths and providing a plurality of mixed audio outputs for transmission back to said receiving multimedia terminals.

18. The multimedia conferencing system according to claim 17, wherein said adaptive audio delay controller is operable to control delay in a particular delay path based on audio activity in both the corresponding audio output channel and on audio activity in other audio output channels of the other multimedia terminals.

19. The multimedia conferencing system according to claim 17, wherein said adaptive audio delay controller is operable to control delay in a particular delay path based on audio activity in both the corresponding audio output channel and on audio activity in other audio output channels of the other multimedia terminals, by taking into account the audio delays in said other audio output channels.

20. The multimedia conferencing system according to claim 14, further comprising means for implementing asymmetrical audio delay wherein audio delay of a monologue speaker who has been actively speaking for at least said predetermined amount of time substantially matches video delay of the monologue speaker, while audio delay of other speakers are minimally delayed, to thereby enable interruptions or questions of the other speakers to be minimally delayed.

21. A method of performing multimedia conferencing, comprising the steps of:
- determining if speech is actively occurring on an audio channel;
- determining if the number of floor changes is greater than a predetermined number;
- increasing an audio delay to at least substantially a delay of a corresponding video if speech has been actively occurring for more than a predetermined amount of time and the number of floor changes is not greater than the predetermined number; and
- decreasing the audio delay to less than the delay of the corresponding video if speech has not been actively occurring for more than a predefined amount of time and the number of floor changes is greater than the predetermined number.

22. The method of performing multimedia conferencing according to claim 21, wherein the step of determining if speech is actively occurring on an audio channel is performed by monitoring voice energy on the audio channel.

23. The method of performing multimedia conferencing according to claim 21, wherein the step of determining if speech is actively occurring on an audio channel is performed by monitoring outgoing audio to determined if speech is actively occurring.

24. The method of performing multimedia conferencing according to claim 21, wherein the step of determining if speech is actively occurring on an audio channel is performed by monitoring incoming audio on the audio channel to determine if speech is actively occurring.

25. The method according to claim 21, wherein said step of increasing an audio delay to at least substantially a delay of corresponding video if speech has been actively occurring for more than a predetermined amount of time implements audio delay for a monologue speaker, and said method further comprises the step of minimally delaying audio of other speakers to thereby enable interruptions of the monologue speaker or questions by the other speakers to be minimally delayed.

26. A method of performing multimedia conferencing, comprising the steps of:

determining if one or more audio channels are active;

determining if the number of floor changes is greater than a predetermined number:

adjusting delay difference between an audio signal and a corresponding video signal so that the delay difference associated with a particular audio channel is minimized if only the particular one of the audio channels has been active for more than a predetermined period of time and the number of floor changes is not greater than the predetermined number; and if multiple audio channels have been active for more than a predefined period of time and the number of floor changes is greater than the predetermined number, adjusting the delay difference between the audio signals and the video signal in each of said multiple channels so that the delay of each audio signal is less than the corresponding video delay.

27. The method according to claim 26, wherein if only said particular audio channel has been active for more than a predetermined period of time, and said particular audio channel becomes silent, then said minimized delay difference of said particular channel is maintained unless one or more of the other channels becomes active.

* * * * *